United States Patent [19]

Geiger et al.

[11] Patent Number: 5,531,888

[45] Date of Patent: Jul. 2, 1996

[54] ARRANGEMENT FOR SEPARATION OF COARSE MATTER AND/OR BULKY SOLIDS IN RAINWATER RELIEF STRUCTURES

[75] Inventors: Wolfgang Geiger, Gräfelfing; Erwin Ruhl, Herbstein, both of Germany

[73] Assignee: VSB VOGELSBERGER Umwelttechnischer Anlagenbau GmbH, Lautertal, Germany

[21] Appl. No.: 281,462

[22] Filed: Jul. 27, 1994

[30] Foreign Application Priority Data

Jul. 28, 1993 [DE] Germany .......................... 43 25 278.8
Oct. 23, 1993 [DE] Germany .......................... 43 36 228.1

[51] Int. Cl.⁶ .................................................. E03F 5/10
[52] U.S. Cl. ........................ 210/162; 210/170; 210/248; 210/305; 210/433.1; 137/561 A; 405/36; 405/39
[58] Field of Search .................................. 210/153, 154, 210/162, 170, 248, 433.1, 299, 304, 305; 137/561 A; 405/36, 39

[56] References Cited

U.S. PATENT DOCUMENTS

| | | | |
|---|---|---|---|
| 815,722 | 3/1906 | Lydon | 210/154 |
| 1,825,169 | 9/1931 | Wyckoff | 210/154 |
| 4,578,188 | 3/1986 | Cousino | 137/561 A |
| 4,919,568 | 4/1990 | Hurley | 210/170 |

FOREIGN PATENT DOCUMENTS

| | | |
|---|---|---|
| 0358952 | 8/1989 | European Pat. Off. . |
| 1362158 | 9/1964 | France . |
| 2613578 | 9/1981 | Germany . |
| 2458157 | 3/1984 | Germany . |
| 4125419 | 8/1992 | Germany . |
| 4139572 | 6/1993 | Germany . |
| 681358 | 3/1993 | Switzerland . |
| 487803 | 7/1938 | United Kingdom . |

*Primary Examiner*—Christopher Upton
*Attorney, Agent, or Firm*—Baker & Daniels

[57] ABSTRACT

An arrangement for the separation of pollutants and, as the case may be, bulky solids, i.e. coarse matter, in separating structures, such as rainwater relief structures for the protection of bodies of water. The rainwater or combined water exceeding a critical combined water outflow is diverted to another part of a sewer system or to a channel leading to a receiving body of water by flowing over a relief weir, and being freed of coarse matter by means of an interceptor prior to its overflow into the channel. The interceptor (20) is fashioned of a plurality of bar elements (21) arranged with preferably equidistant mutual spacing on the overflow side of the relief weir (20), and a separate pollutant channel (22) receives the coarse matter retained by the interceptor (20).

14 Claims, 4 Drawing Sheets

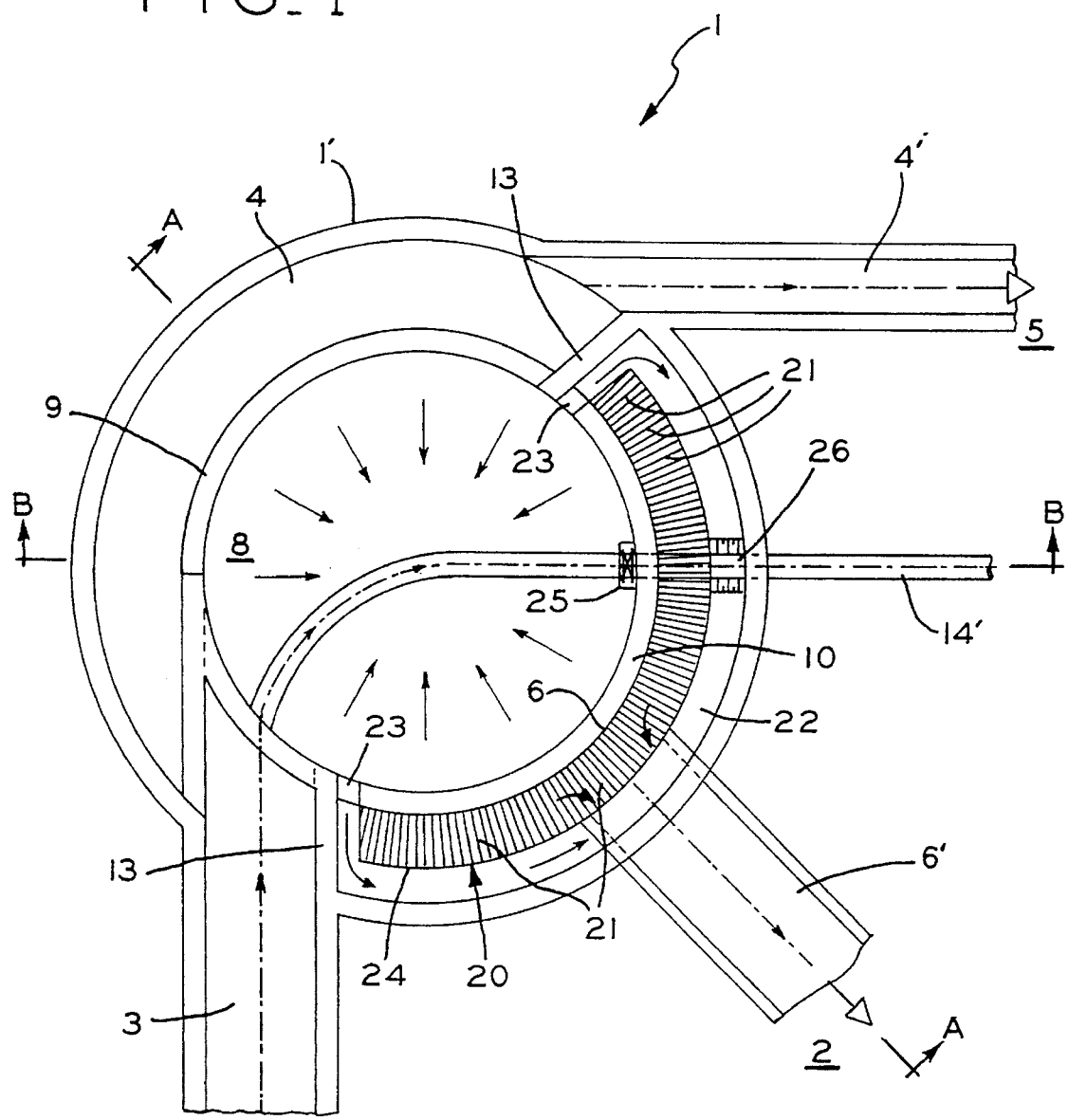
FIG_1

FIG_2
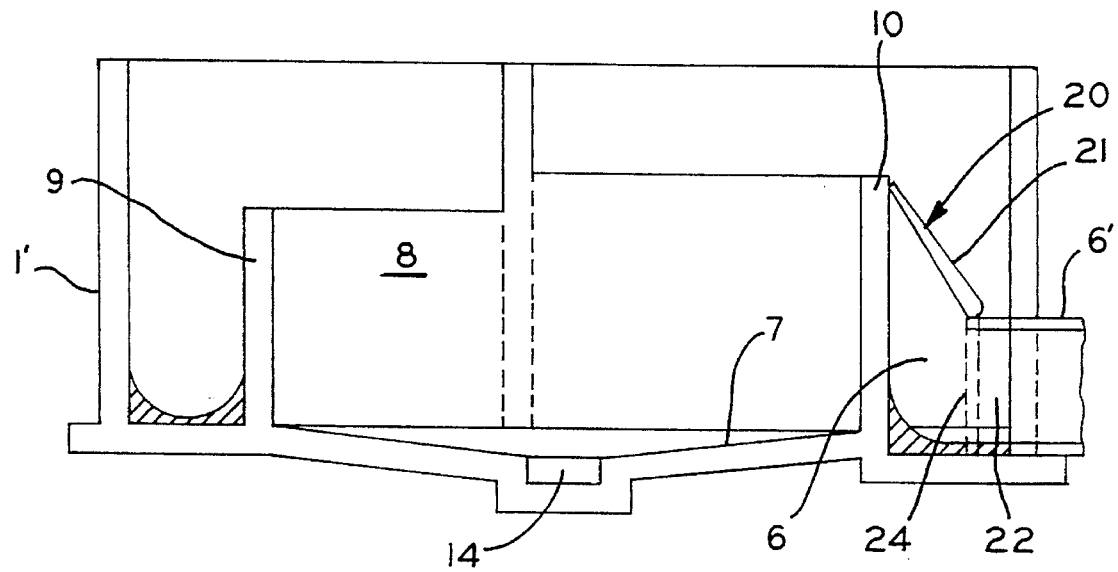
FIG_3
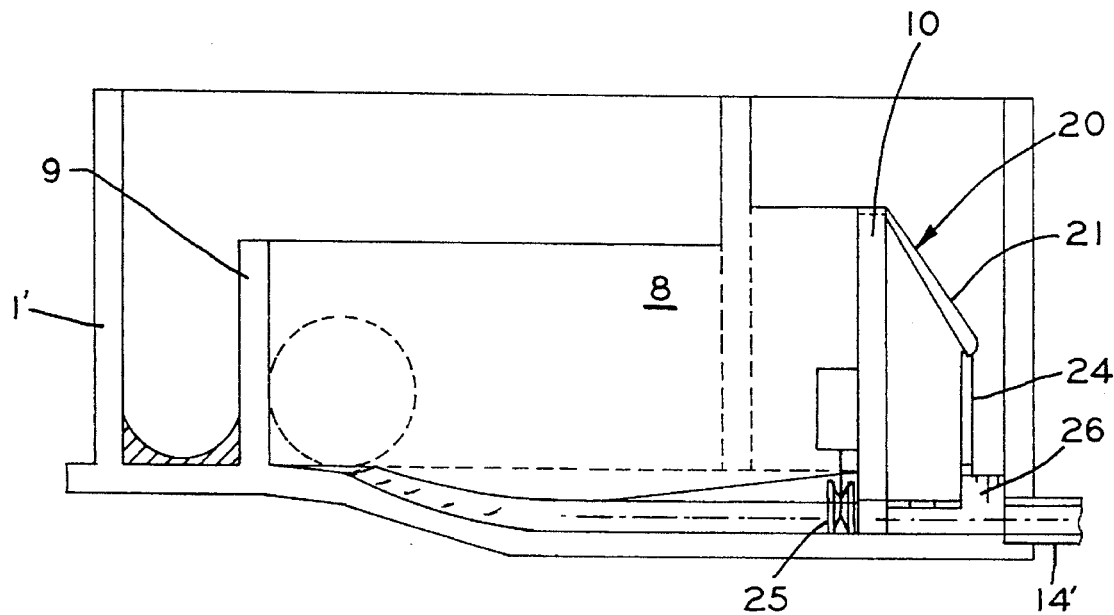

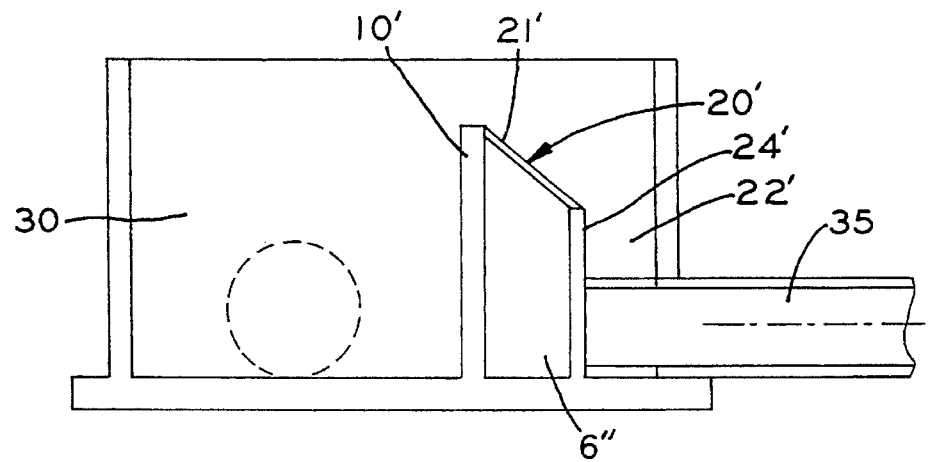
FIG_4
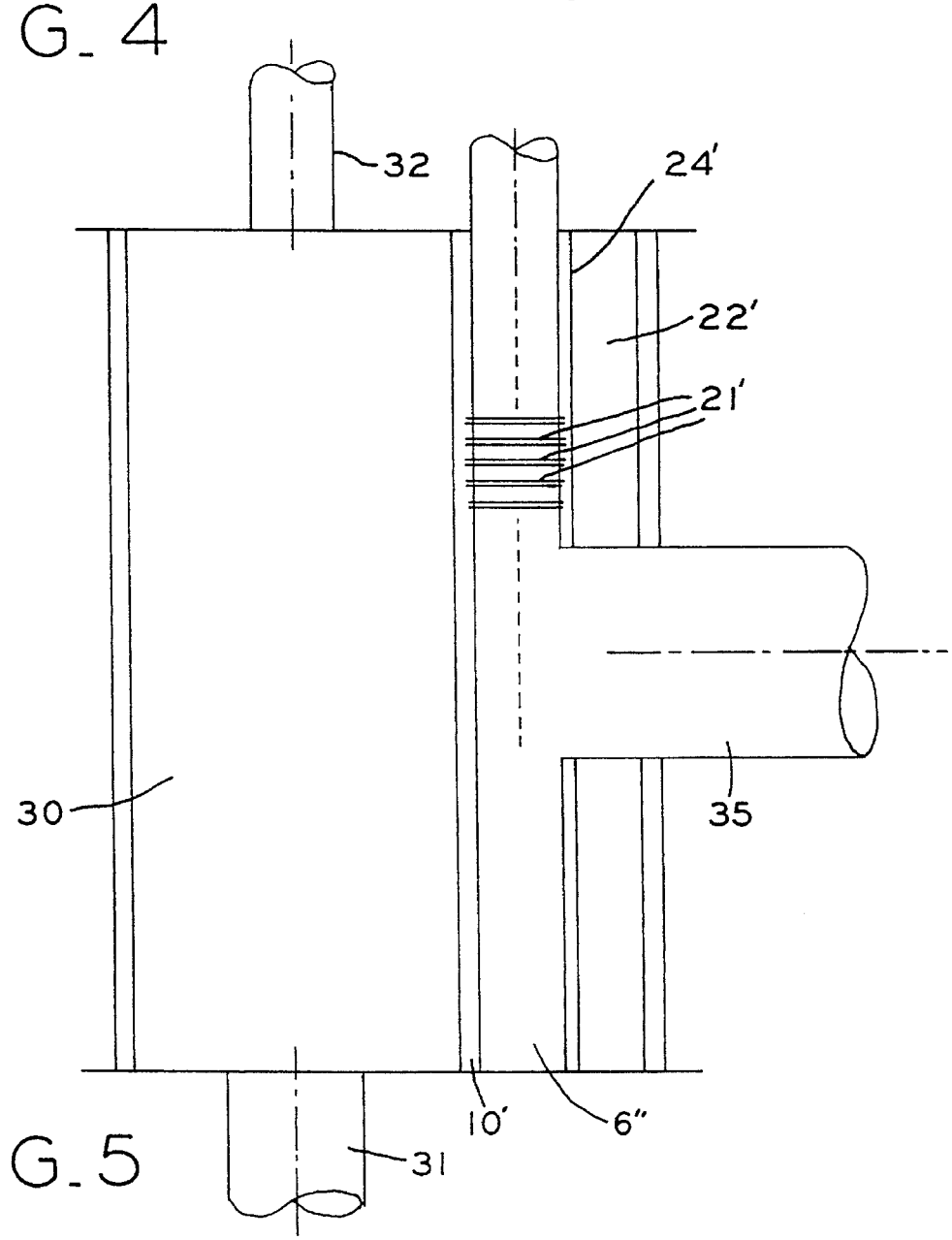
FIG_5

5,531,888

ARRANGEMENT FOR SEPARATION OF COARSE MATTER AND/OR BULKY SOLIDS IN RAINWATER RELIEF STRUCTURES

BACKGROUND OF THE INVENTION

The present invention relates to an arrangement for separation of coarse matter and/or bulky solids in rainwater relief structures. The present invention relates particularly also to a rain basin for sewage treatment plants featuring an overflow for treated water.

Arrangements of this type are known—notably in drainage systems in conjunction with circular rainwater relief structures, for example in OS 41 25 419 and DE-OS 41 39 572, and, by and large, have proved themselves. The intended purpose of rain basins and rainwater relief structures such as retention basins, overflow basins, channel checks and overflows consists in damping the rainwater influx into a receiving body of water and extensively retaining the coarse matter pollutants floating in and on it. The pollutants are then passed to a treatment plant, notably the sedimentation plant.

A rain basin for sewage systems with an overflow for clarified water having an overflow arranged at the basin rim formed by a clear water drain with an overflow weir and a clear water line and where at the transition from the basin to the clear water drain there is an interceptor provided for retention of the pollutants is known, e.g., from DE-PS 24 58 157 and DE-PS 26 13 578. To retain suspended and floating coarse matter, an immersed wall is coordinated here with the overflow. While the water or waste water flowing via the clear water drain to a receiving body of water or similar is thereby relatively dependably rid of the coarse matter carried by the influx in the rain basin, it remains to be stated as regards the coarse matter rising between the immersed wall and the clear water drain that these will proceed into the clear water drain and, as the case may be, clog the clear water line.

The present invention relates quite generally to a coarse matter separation for any kind and any application of separating structures for the protection of bodies of water, that is, for storm sewers just the same as for combined sewers, but also for any conceivable random aggregation and combination of structures. The question of the shape of these structures is just as irrelevant as is that of whether the structure is employed within a network of sewers, in conjunction with rainwater relief or as a rain basin with a sedimentary or basin overflow. The basic concern simply is to separate a flow of matter in two partial flows whereof one is a drainage adjusted to a prescribed limit value, while the second partial flow represents the excess that needs to be, or is, separated for specific treatment.

The screen systems known in conjunction with the aforementioned rainstorm basins have proved themselves as regards their operating principle—but exactly with circular tanks it has been demonstrated that the spiral flow, which ensures a good removal of coarse matter via the bottom drain line, may be excessively impaired nonetheless. Moreover, it has been noted that the flow from the tank and through the screen setup is associated with a relatively strong buoyancy which, possibly, is capable of entraining also coarser pollutants.

The problem underlying the present invention, more generally, consists in providing an arrangement of the categorical type where the flow in the rainwater basin remains entirely unaffected.

SUMMARY OF THE INVENTION

In conjunction with the rain basin according to the invention, the problem underlying the present invention consists in avoiding the clear water drainage problems illustrated above from the outset.

The general problem underlying the present invention is solved by arranging the bar elements on the overflow side of the relieve weir and providing a separate pollutant channel which receives the coarse matter retained by the interceptor.

In conjunction with the rain basin according to the invention, the solution to the aforementioned problem consists in composing the clear water drain of a channel covered by the interceptor and functionally tied to the clear water line and a pollutant channel carrying the pollutants (coarse matter) retained by the interceptor, with the clear water channel and pollutant channel being mutually separated by a partition.

The core of the present invention consists in screening the so-called excess water only after it overflows the relief weir and disposing of the separated pollutant load by way of a separate sewage channel. In a rain basin, the core of the present invention consists in allowing the water flowing via the overflow into the clear water drain unimpeded influx and filtering the entrained coarse matter, if any, out before drainage via the clear water line. This ensures that all of the coarse matter and pollutants suspended in the excess water can drain from the rain basin and be removed separately. The rain basin can be considered a mechanical sedimentation plant for coarse matter.

Special embodiments, advancements and coordinations include the bar elements and the design of the sewage channel and features relating to its purging. Cited additionally are also specific details relating to circular rainwater relief structures, in which context it is explicitly pointed out though that the principle of the invention, more generally, is applicable also to straight overflows and such of different shape.

BRIEF DESCRIPTION OF THE DRAWINGS

The details of the preferred embodiments will be more fully explained hereafter with the aid of the drawings, wherein:

FIG. 1 is a plan view of a rain overflow fashioned as a circular basin serving as a rainwater relief structure;

FIG. 2 is a cross-sectional illustration of the overflow of FIG. 1 taken along line A—A;

FIG. 3 is a cross-sectional illustration of the overflow of FIG. 1 taken along line B—B;

FIG. 4 is a basic illustration of the separation of pollutants in conjunction with a channel check;

FIG. 5 is the illustration according to FIG. 4 in cross section;

DETAILED DESCRIPTION

Figure 6:
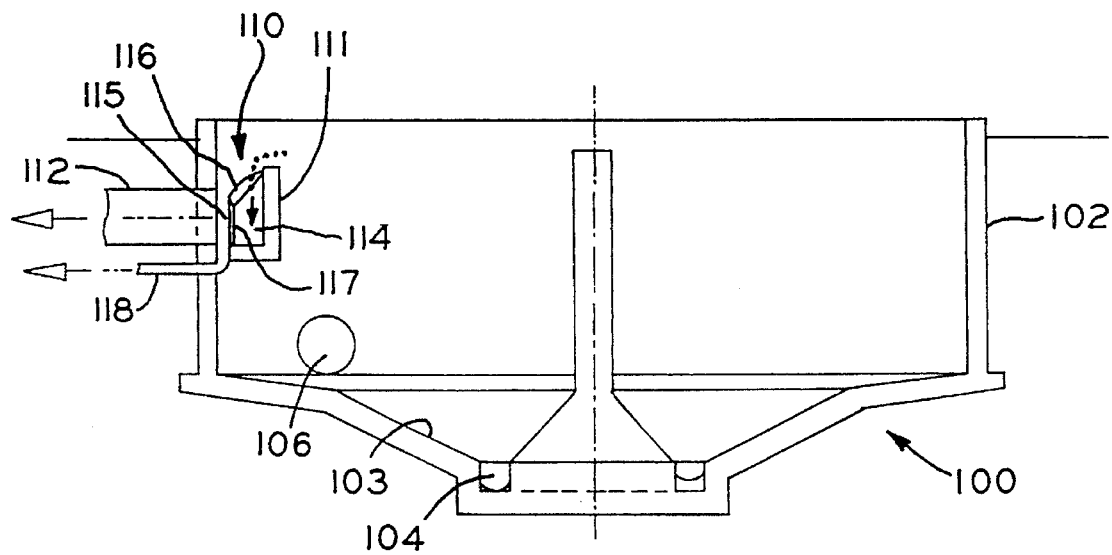
FIG. 6 is an axial section through a rain basin.

FIGS. 1, 2 and 3 show an overflow 1 serving basically to provide, in case of outflows which due to rainstorms exceed a critical combined water outflow, a relief toward a receiving body of water 2, i.e., to a lake and/or river. Hence, rain overflows limit the combined water to be passed to a treatment system, for example a sedimentation plant 5, to a critical combined water outflow. Any excess water is passed into the receiving body of water 2. The overflow 1 serves thus not as a storage volume, but as a separating structure between a feeder to the sedimentation plant 5, for one, and to the receiving body of water 2, for another.

The overflow 1 according to FIGS. 1, 2 and 3 comprises a circular inner structure 1' with an inlet for combined water coming, e.g., from the sewer system, an approximately tangentially oriented outlet channel 4 with a drain 4' to the further sewer system, that is, ultimately to the connected sedimentation plant 5 or a rain overflow basin arranged before the latter, and a channel 6 with a drain 6' to the receiving body of water 2.

The circular structure 1' has a bottom 7 sloping toward the center (FIG. 2) and forms a catchment 8 which borders on the combined water inlet 3 generally and is separated from the channel 4 extending to the sedimentation plant 5 by a first overflow weir 9. Moreover, the catchment 8 is separated from the channel 6 to the receiving body of water 2 by a second relief weir 10 whose crown is at a level higher than that of the first weir 9. Viewed in terms of function and design, it is noted that the sectors of the circular structure 1' serving as catchment 8 and bounded by overflow weir 9, respectively the relief weir 10, are separated from each other by bulkheads 13 which are higher than the maximum water level in the circular structure 1' which comes about at maximum combined water influx. In addition, the overflow 1 includes in the area of the catchment center, which is lower due to the sloping bottom 7, a bottom drain 14 which, in turn, leads via a bottom drain line 14' to the sedimentation plant 5. The drain 4' to the channel system and the bottom drain line 14' converge prior to their influx to the sedimentation plant 5 normally in a regulating shaft which, as the case may be, comprises a plenum shaft.

The function of the rain overflow 1 according to the drawing is as follows:

During dry weather, the combined water influx from the sewer system proceeds via the inlet feeder 3 oriented tangentially to the catchment 8 and is deflected here, in keeping with the circular shape of catchment 8, spirally to the low-level bottom drain 14. From here, the waste water proceeds via the bottom drain line 14' to the sedimentation plant 5.

In case of rainfall, the amount of combined water flowing to the sedimentation plant 5 is limited to a prescribed setpoint. The drainage capacity of the bottom drain line 14' being insufficient (dimensioned only for dry-weather conditions and thus smaller than the setpoint), the combined water backs up in the catchment 8 and rises to the level of the first weir 9, with a distinct rotary flow of the combined water coming about in the catchment 8. The excess combined water influx is now split off through said first (overflow) weir 9 and proceeds via the channel 4 or drain 4' to the sedimentation plant 5 or an overflow basin, the prescribed set drainage being maintained, or not exceeded, by a drainage reduction (for instance in the follow-on regulating shaft).

When the combined water influx exceeds the set drainage and the water in the catchment 8, and thus also in the channel 4, continues to rise and reaches or surmounts a level matching the crown of the relief weir 10, the overflowing combined water (excess water) proceeds eventually via the channel 6 and drain 6' directly to the receiving body of water 2. Here, it must be assured that the water split off into the receiving body of water 2 is free of coarse and floating matter, i.e, of pollutants and bulky solids.

The floating matter buoyed up in the catchment 8 are with the water overflow across the weir 9 dumped in the channel 4 and proceed from there via the drain 4 (or, as the case may be, via a second, separate floating matter drain line) to the regulating shaft and on to the sedimentation plant 5. As the water level drops again after a rainfall, the "residual water" due to its rotary flow in the catchment 8, cleans the latter.

The rainwater relief structure described so far in terms of design and function pertains to the prior art.

The object of the present invention is a configuration or concept which—in view of the specific embodiment—guarantees optimum separation of coarse matter from the excess water flowing to the receiving body of water 2, without impairing the rotary flow. This configuration is based on an interceptor 20 which, connected radially to the relief weir 10, for one, prevents coarse matter from proceeding into the channel 6 on the water body end and, for another, ensures that these pollutants proceed into a drain by way of which they are carried to the follow-on sedimentation plant 5.

According to the circular structure 1' illustrated in FIGS. 1, 2 and 3, the interceptor 20 consists of a plurality of mutually equidistantly arranged bar elements 21 which radially outwardly diverge conically relative to one another. With a straight overflow, the bar elements would naturally be arranged parallel. This array of bar elements 21 forms a grid which, for one, allows passage of the excess water while, for another, retains all coarse matter larger than the bar spacing.

The grid formed of bar elements 21 covers the channel 6 to the receiving body of water. Bordering on channel 6, coaxially to the axis of the circular structure 1' is a pollutant channel 22 which receives the coarse matter retained by the bar elements 21 and passes them to a drain. According to the illustrated embodiment, the drain is established by an open connection from the pollutant channel 22 to the bottom drain line 14', so that the coarse matter is, along with those removed via the bottom drain 14, passed directly to the sedimentation plant 5. As illustrated in the drawing, the bottom drain line 14' is open in the area of the pollutant channel 22, allowing the coarse matter supplied by the bar elements 21 to proceed directly to bottom drain line 14'.

The coarse matter transport in the pollutant channel is accomplished through flushing troughs 23 molded sideways in the relief weir 10 near the bulkheads 13. Already before the crown of relief weir 10 is reached, excess water flows through these flushing troughs 23 into the pollutant channel 22, which channel thus is first precleaned and—at the end of rainfall—cleaned over again. Alternatively, or as a supplement to the flushing trough, a flushed space or box (not shown) may be arranged, the contents of which are then removed upon emptying of the tank.

According to the embodiment described so far, the bar elements 21 form a horizontal (or optionally slanted) grid 21. The separated coarse matter is thus pushed by the following matter toward the end of the bar elements 21 and eventually drops into the pollutant channel 22. As follows from the presentations in FIGS. 2 and 3, however, the bar elements 21 extend, in keeping with the preferred embodiment, obliquely from a partition 24 bordering on the pollutant channel 22 to the relief weir 10, so that the coarse matter slides under gravity into the pollutant channel 22.

From the presentation in FIGS. 2 and 3 in conjunction with FIG. 1 it can be seen, furthermore, that the bar elements 21 are narrow rectangular strips which, in cross section, taper from the relief weir 10 to partition 24. The objective of this is for any strip type material being caught in the upper area adjacent to the relief weir 10 to free itself again as it is shoved downward by following coarse matter. Moreover, the bar elements 21 may feature a fillet on their top side, so that a uniform sliding film is obtained.

In view of actual operation, the following should be pointed out for the sake of completeness. As mentioned, the excess water entering the pollutant channel 22 by way of the flushing troughs 23 carries the coarse matter to the bottom drain line 14'. It is necessary to ensure that the receiving capacity of this bottom drain line 14' will be reduced to an extent such that the coarse matter will be allowed influx from the pollutant channel 22. To safeguard such, a controller 25 is integrated in the course of the bottom drain line 14', in the area of the inside of the relief weir 10, which controller enables a reduction of the discharge from the bottom drain 14 and through the bottom drain line 14'.

FIGS. 4 and 5 describe schematically once more the solids separation illustrated with the aid of a so-called rainstorm basin, in conjunction with a rectangular channel check 30.

The channel check 30 comprises a feeder inlet 31 and a drain 32; additionally it features across its entire length an overflow, or relief, weir 10' on which borders a channel 6". Channel 6" connects via the drain 35 with a receiving body of water 2.

According to this embodiment of the present invention, the channel 6" to the receiving body of water is divided by a partition 24' which relative to the relief weir 10' is low. The part of the channel away from the relief weir 10 serves as pollutant channel 22'. The interceptor 20 consists of a plurality of equidistant parallel bar elements 21' arranged between the crown of the relief weir 10 and the top edge of partition 24'. When the critical combined water outflow is exceeded in the channel check 30, the excess water flows via the interceptor 20' into the channel 6" leading to the receiving body of water. The coarse matter is caught on the bar elements 21' and slides into the pollutant channel 22". From there, the coarse matter is then carried via a drain line (not shown) to the sedimentation plant. Analogous to the flushing trough or a flushing space or box, a flushing and reflushing option needs to be provided for the pollutant channel 22'.

Figure 7:
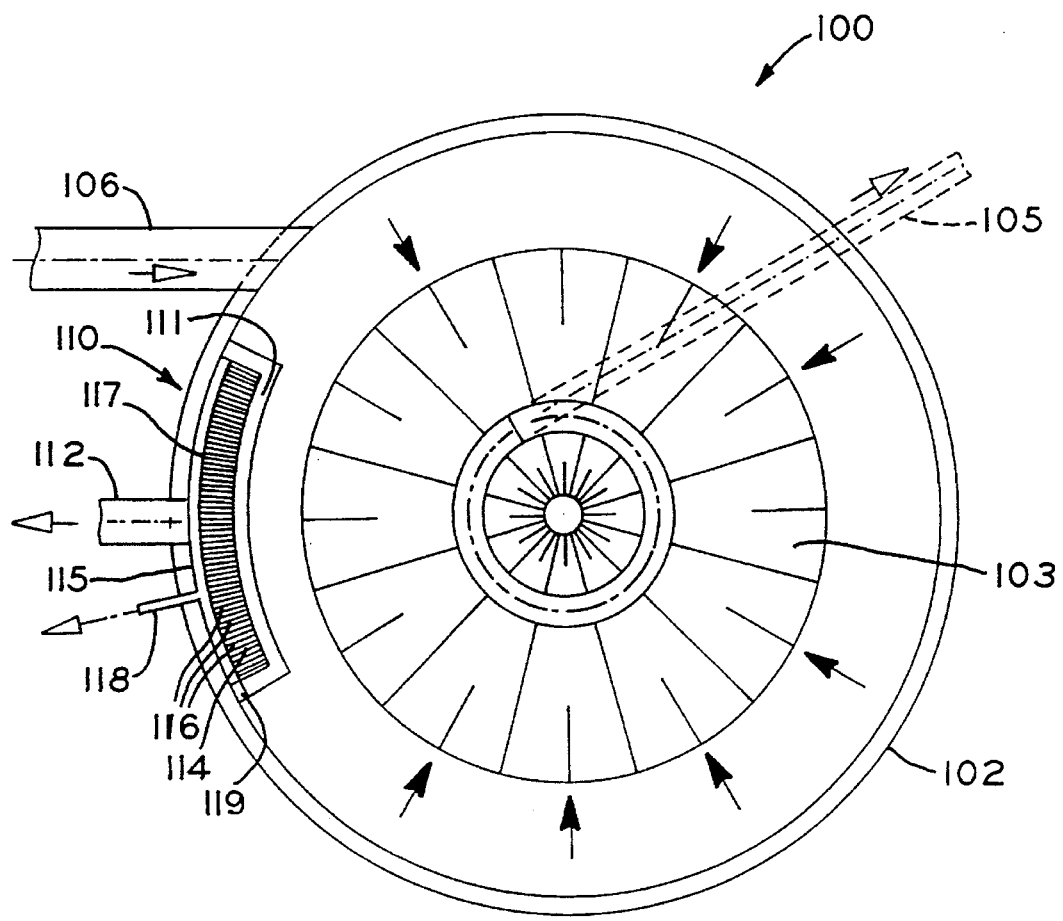
FIG. 7 is a plan view of the rain basin of FIG. 6.

FIGS. 6 and 7 show a rain basin with an integrated screen fashioned analogously to the previously described interceptor.

The tank 100, which may also be of portable design, has a circular layout. It is explicitly pointed out, however, that the present invention is not limited to circular rain basins, but can be used equally with rain basins of rectangular or any other shape.

Bordering on the vertical defining, or side, wall 102 of the basin 100 is a bottom 103 which toward the centerline, or axis of symmetry, of the basin 100 is downwardly conic. Located in the center, i.e., at the lowest point of the cone, is a sludge outlet 104 to which a sludge removal line 105 is connected. Above the conic basin bottom 103 empties a feeder inlet 106 passing combined water (rainwater and sewage) into the interior of the basin. The part of the basin interior located below the inlet 106 is the so-called sludge zone; the part above the inlet 106 is the so-called sedimentation zone.

Provided on the basin rim is a clear water drain 110 which, whenever the level in the basin 100 exceeds a prescribed height marked in terms of design by the overflow 111, receives the excess water and passes it to a clear water line 112. When its holding capacity is exceeded, the rain basin may be relieved via this clear water line 112 into a receiving body of water.

To clean the excess water flowing into the receiving body of water and to prevent pollutants and coarse matter from proceeding into the body of water, provisions are to separate the said clear water drain 110 into a channel 114 which functionally is tied to the clear water line 112 and a separate pollutant channel 115. The channel 114 is covered by way of an interceptor 116 formed of bar elements, notably fins, with a curved surface. The bar elements are arranged spaced preferably 4 mm from each other, thus forming a kind of cover for the channel 114, which cover allows excess water to pass whereas it retains coarse matter.

The channel 114 and the pollutant channel 115 are mutually separated by a partition 117 whose crown ranges lower than that of overflow 111. This creates an interceptor 116 extending from the overflow 111 obliquely down toward the basin rim and to the partition 117, thus allowing the coarse matter flowing with the excess water into the clear water drain 110 to slide into the pollutant channel 115. Pollutant channel 115 features a drain pipe 118 of its own through which the coarse matter then is, or can be, fed to a separate treatment system, for example a sedimentation plant. To allow at the outset of a major rain a "soaking" and precleaning of the pollutant channel 115, before reaching the level corresponding to the overflow 111, the pollutant channel 115 features a flushing trough 119 which relative to the overflow 110 is situated slightly lower.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In combination:
    a rainwater relief structure comprising an inlet connected to a rainwater collection system and a plurality of outlets, said plurality of outlets including an excess water relief outlet, said rainwater relief structure further comprising a relief weir between said inlet and said relief outlet; and
    an arrangement for the separation of at least one of coarse matter and bulky solids from water in said rainwater relief structure, comprising:
        an interceptor arranged in the area of said relief weir and comprised of spaced bar elements, wherein said bar elements are arranged on an overflow side of said relief weir for retaining at least one of the coarse matter and bulky solids within water overflowing said relief weir toward said relief outlet; and
        a separate pollutant channel positioned to receive at least one of the coarse matter and bulky solids retained by said interceptor.

2. The combination of claim 1 wherein said relief outlet communicates with a receiving body of water, wherein said rainwater relief structure comprises a relief channel between said interceptor and said relief outlet, wherein said pollutant channel and said relief channel extend mutually parallel and are mutually separated by a partition which is lower than said relief weir, and wherein said bar elements are fixed on an edge of said relief weir and on a top edge of said partition.

3. The combination of claim 1 wherein said arrangement further comprises at least one flushing trough positioned at at least one end of said relief weir, said at least one flushing trough situated lower than a crown of said relief weir and opening toward said pollutant channel.

4. The combination of claim 1 wherein said pollutant channel is in flow communication with a feeder leading to a treatment system for at least one of coarse matter and bulky solids.

5. The combination of claim 1 wherein said bar elements are fashioned as narrow strips.

6. The combination of claim 5 wherein said narrow strips, viewed transverse to an overflow direction, are conically structured and each include a wider end, and wherein said narrow strips are arranged such that said wider ends abut a partition disposed radially of said relief weir.

7. The combination of claim 5 wherein said bar elements have a fillet on their top side.

8. In combination:
a rainwater relief structure comprising an inlet and a plurality of outlets, said plurality of outlets including an excess water relief outlet, said rainwater relief structure further comprising a relief weir between said inlet and said relief outlet; and an arrangement for the separation of at least one of coarse matter and bulky solids from water in said rainwater relief structure, comprising:
  an interceptor arranged in the area of said relief weir and comprised of spaced bar elements, wherein said bar elements are arranged on an overflow side of said relief weir for retaining at least one of the coarse matter and bulky solids within water overflowing said relief weir toward said relief outlet; and
  a separate pollutant channel positioned to receive at least one of the coarse matter and bulky solids retained by said interceptor;
wherein said rain relief structure is circular and comprises:
  a sedimentation plant channel;
  a sedimentation weir disposed between said inlet and said sedimentation plant channel, said sedimentation weir being lower than said relief weir;
  an arcuate channel disposed between said relief weir and said relief outlet, wherein said relief outlet communicates with a receiving body of water;
  said sedimentation plant channel and said arcuate channel being mutually separated and said pollution channel being disposed coaxially to said arcuate channel; and
  said bar elements extending from said relief weir and flaring conically outwardly and downwardly.

9. In a sewage system, a rain basin comprising:
a tank;
an inlet connected to a sewer system for introducing combined water including rainwater and sewage into said tank, said combined water including coarse matter;
a sludge outlet for said tank;
a clear water drain into which passes an overflow of clarified water arranged at a rim of said tank, said clear water drain comprising an overflow weir and a clear water line;
an interceptor for retaining the course matter disposed at a transition from said tank to said clear water drain; and
wherein said clear water line comprises:
  a channel covered by said interceptor and in flow communication with said clear water line, and
  a pollutant channel positioned to remove coarse matter retained by the interceptor, said pollutant channel separated from said clear water channel.

10. The rain basin of claim 9 wherein said interceptor is formed by a plurality of equidistantly arranged bar elements.

11. The rain basin of claim 10 wherein said bar elements are fins with a curved top edge.

12. The rain basin of claim 10 wherein the spacing between said bar elements amounts to about 4 mm.

13. The rain basin of claim 9 further comprising a drain pipe for the coarse matter, wherein said pollutant channel is in flow communication with said drain pipe, and wherein said drain pipe is arranged radially on said tank.

14. The rain basin of claim 9 wherein said pollutant channel comprises at least one flushing trough toward an interior of said tank, and wherein said at least one flushing trough is situated lower than said overflow weir.

* * * * *